United States Patent [19]
Ernisse et al.

[11] 3,812,500
[45] May 21, 1974

[54] AUTOMATIC SHUTTER CONTROL FOR PHOTOGRAPHIC CAMERAS

[75] Inventors: Paul J. Ernisse; Arnold J. Ettinger, both of Rochester, N.Y.

[73] Assignee: Eastman Kodak Co., Rochester, N.Y.

[22] Filed: July 6, 1972

[21] Appl. No.: 269,371

Related U.S. Application Data

[63] Continuation of Ser. No. 127,476, March 24, 1971.

[52] U.S. Cl. ............................................. 354/32
[51] Int. Cl. .............................................. G03b 7/08
[58] Field of Search .......... 95/10 CE, 10 CT, 53 EB

[56] References Cited
UNITED STATES PATENTS

| | | | |
|---|---|---|---|
| 3,645,185 | 2/1972 | Kitai | 95/53 |
| 3,650,193 | 3/1972 | Shimizu | 95/53 |
| 3,496,852 | 2/1970 | Rittman | 95/53 |
| 3,670,635 | 6/1972 | Ort | 95/53 X |
| 3,326,103 | 6/1967 | Topaz | 95/10 |
| 3,433,138 | 3/1969 | Burgarella | 95/10 |
| 3,535,989 | 10/1970 | Kitai | 95/10 |
| 3,444,798 | 5/1969 | Mayr et al. | 95/10 X |

FOREIGN PATENTS OR APPLICATIONS
1,928,877  10/1970  Germany ............................ 95/10

*Primary Examiner*—Samuel S. Matthews
*Assistant Examiner*—Michael L. Gellner
*Attorney, Agent, or Firm*—John L. Palmer

[57] ABSTRACT

In a camera having a photoelectric timing circuit for determining shutter speed in accordance with the intensity of scene illumination, a mechanical speed control is provided for controlling movement of an inertia member to establish at least one predetermined shutter speed. A control member is actuatable in response to insertion of a flash lamp unit into the camera to disable a shutter control transducer in the timing circuit and to actuate the mechanical speed control to permit the inertia member to move a first preselected distance before returning to close the shutter. The control is adapted, when the transducer is disabled, and no flash lamp unit is inserted in the camera, to control the length of travel of the inertia member for providing a shutter speed corresponding to the camera's fastest shutter speed.

2 Claims, 3 Drawing Figures

PAUL J. ERNISSE
ARNOLD J. ETTINGER
INVENTORS

BY William F. Delany Jr.
W. H. J. Kline
ATTORNEYS

PATENTED MAY 21 1974 3,812,500

PAUL J. ERNISSE
ARNOLD J. ETTINGER
INVENTORS

BY *William F. Delaney Jr.*

*W.H.J. Kline*

ATTORNEYS

AUTOMATIC SHUTTER CONTROL FOR PHOTOGRAPHIC CAMERAS

This application is a continuation of application Ser. No. 127,476, filed Mar. 24, 1971.

BACKGROUND OF THE INVENTION

This invention relates to automatic shutter controls for photographic cameras and more particularly to such shutter controls of the type including a light-integrating timing circuit.

Exposure control systems are well known which employ light-integrating timing circuits including a photoresistor for establishing shutter speed as a function of the level of scene illumination. Typically, such systems are adapted for flash exposures by switching a fixed resistance into the circuit in place of the photoresistor to establish a predetermined shutter speed. Although such arrangements are generally satisfactory, they require sufficient battery power to activate the timing circuit and the flash lamp simultaneously. Moreover, such systems usually can be operated at only one mechanically established speed when the circuit is not energized by sufficient battery power, which is usually its fastest speed.

SUMMARY OF THE INVENTION

It is an object of this invention to provide an improved automatic shutter control of the type including a light-integrating, timing circuit for determining shutter speed.

Another object of this invention is to provide such a shutter control including mechanical means for establishing a predetermined shutter speed for operation with a flash lamp.

A further object of this invention is to provide such a shutter control adapted for operation selectively at a plurality of predetermined shutter speeds when the circuit is not energized sufficiently for satisfactory timing of shutter speed.

These objects are accomplished according to the preferred embodiment of this invention by an automatic shutter control for a camera including a light-integrating timing circuit for determining shutter speed in accordance with the level of scene illumination, and a mechanical speed control that establishes a predetermined shutter speed when a control member is actuated, for example in response to insertion of a flash lamp in a socket on the camera. The timing circuit includes an electro-mechanical transducer that holds the shutter blades open until the transducer is actuated to terminate the exposure interval at the end of a period determined by the circuit. The control member is adapted to disable the transducer and to actuate a mechanical timing device that establishes a predetermined shutter speed, when a flash lamp is in the camera socket. When the timing circuit is inoperative and the mechanical timing device is deactuated, the shutter operates at its fastest speed, for example 1/250 second.

Such an arrangement provides alternative, mechanically established shutter speeds when the timing circuit is not sufficiently energized by a voltage source, such as a battery. In such event, the camera can be operated at its fastest mechanical shutter speed, for example 1/250 second or the control member can be actuated to activate the mechanical timing device that establishes the predetermined shutter speed for flash operation. The latter speed would be appropriate for operations in daylight conditions without the use of a flash lamp. Moreover, if the subject invention is incorporated in a camera adapted for use with a percussive type of flash lamp, flash pictures could be taken regardless of the operability of the timing circuit.

BRIEF DESCRIPTION OF THE DRAWINGS

In the detailed description of the preferred embodiment of the invention presented below, reference is made to the accompanying drawing in which.

DETAILED DESCRIPTION OF THE PREFERRED EMBODIMENT

Because cameras are well known, the present description will be directed to elements forming part of, or cooperating more directly with the present invention. Camera parts not specifically shown or described may take various forms well known to those skilled in the art.

Figure 1:
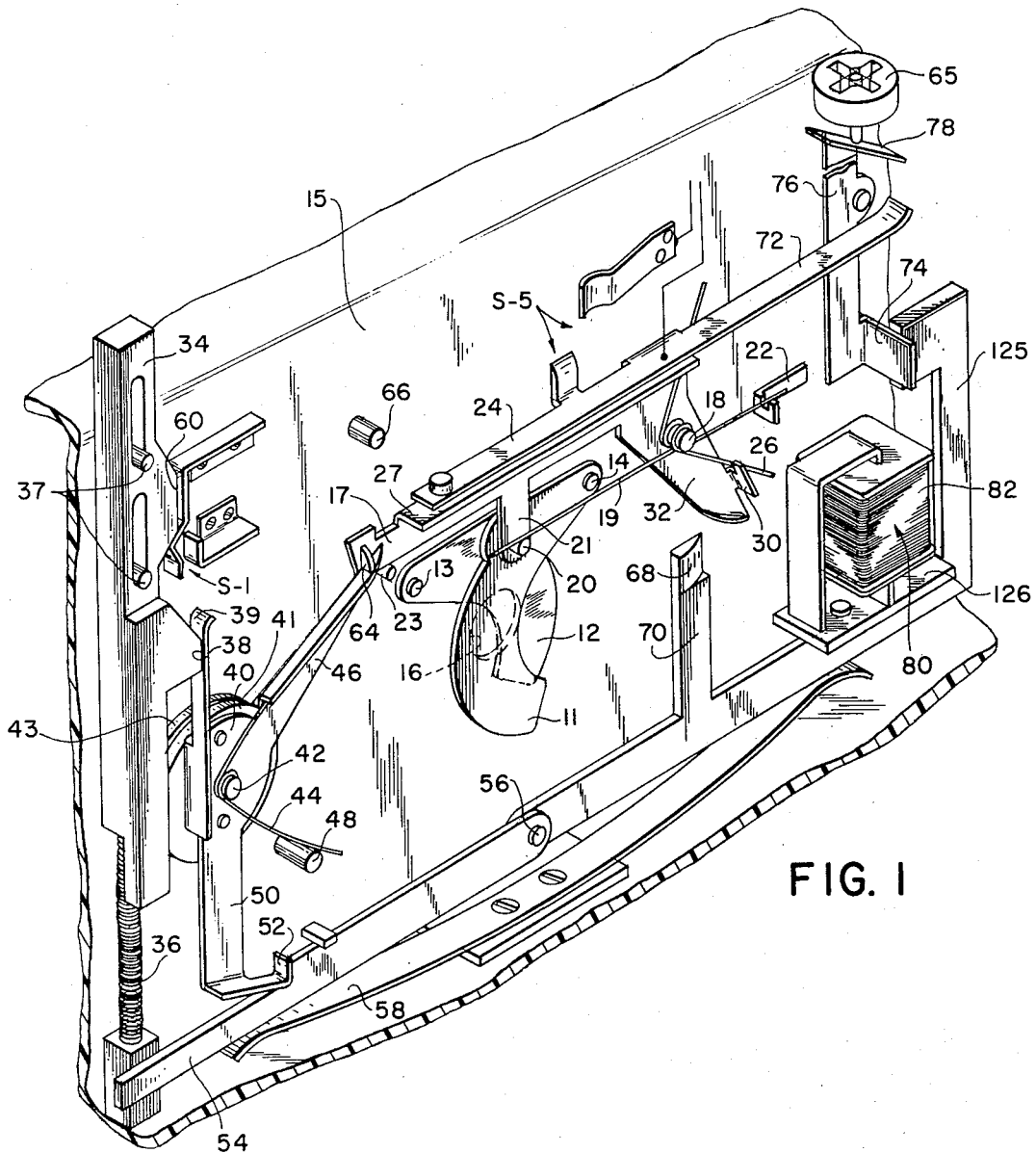
FIG. 1 is a perspective view of a shutter control mechanism according to the preferred embodiment of the invention in its cocked position with the open positions of some of the parts of the mechanism indicated in phantom.

In FIG. 1 there is shown a shutter mechanism according to the preferred embodiment of the invention including a pair of shutter blades 11 and 12 pivotally mounted by pins 13 and 14 respectively attached to a support plate 15 for opposed reciprocal motion to uncover and cover an exposure aperture 16 to effect photographic exposures. Pivotal movement of the shutter blades is controlled by an armature 17 pivotally mounted on a pin 18 and biased by a spring 19 having one end attached to a detent 20 on an extension 21 of the armature, and the other end attached to a bracket 22 mounted on the support plate 15. The spring 19 biases the armature 17 in a counter-clockwise direction to the cocked position shown in FIG. 1 against a stop 23; in which position the detent 20 attached to the shutter blades holds the shutter blades in a covering position with respect to the exposure aperture 16. Also mounted on the pin 18 is an inertia lever 24 which is biased by a spring 26 in a counter-clockwise direction towards its rest position in which it is in contact with a support plate 27 attached to the armature 17. The spring 26 has one end attached to a detent 28 on the inertia lever and the other end attached to a detent 30 on an extension leg 32 of the armature 17, so that the inertia lever and the control armature are "scissored" together, that is they are biased toward engagement with each other by the spring 26.

To actuate the shutter mechanism shown in FIG. 1, there is provided a shutter release slide member 34 which is accessible for actuation from the exterior of the camera. The release member 34 is biased by a spring 36 to the cocked position shown in FIG. 1 against a stop 37, in which position a detent 38 engages a plate 39 attached to an impact driver 40 to hold them in their cocked positions. The impact driver includes a rotor 41 pivotally mounted on a pin 42 for rotation with respect to a plate 43 attached to the support 15 to actuate a plurality of switches having contacts associated therewith which control operation of the circuit described below. The driver 41 is biased by a spring 44 having one end attached to an extension 46 on the driver and the other end attached to a detent 48 on the support plate to bias the driver in a counterclockwise direction. The driver is also held in the cocked position shown by the engagement of an extension 50 of the driver with a shoulder 52 of a lever 54 which is mounted on a pivot 56 and biased in a clockwise direction by the force of a spring 58.

Figure 2:
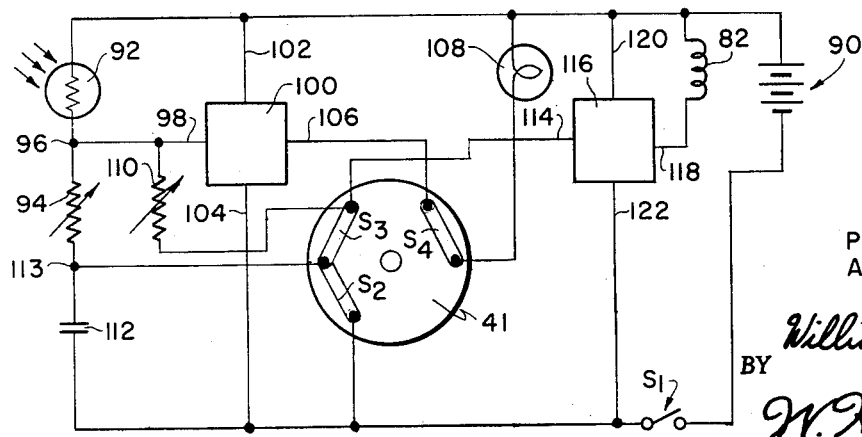
FIG. 2 is a schematic diagram showing an example of a time-delay circuit which can be employed with the shutter mechanism to FIGS. 1 and 3.

When the release member 34 is depressed, a shoulder 60 on the release member closes a power switch S1 to energize the control circuit shown in FIG. 2, and the projection 38 is moved out of blocking relationship with the plate 39 of the driver 40. Further depression of the release member then causes it to engage and depress the lever 54 to remove the shoulder 52 out of engagement with the extension 50 to permit the driver 40 to rotate in a counter-clockwise direction under the influence of the spring 44, so that the arm 46 strikes a detent 64 on the control armature 17 to drive the armature in a clockwise direction against the influence of the spring 19 to open the shutter blades.

When the shutter mechanism is conditioned for use without a flash lamp inserted in a receptacle 65 provided on the camera as shown in FIG. 1, the inertia lever 24 is caused to rotate with the control armature 17 until the extension 32 of the control armature engages a cam surface 68 of a latch member 70 adapted to permit the extension 32 to pass beyond the latch member in one direction but to be retained by the latch member from returning in the opposite direction. Shortly after the extension 32 has proceeded past the latch 70, an extension arm 72 on the inertia lever 24 strikes a stop member 74 on a lever 76 having an extension 78 adapted to sense the presence or absence of a flash lamp in the socket 65. The latch member 70 is urged to the retaining position shown by the spring 58 and an electromagnet 80. Then the latch retains the shutter blade in an open position as long as the coil 82 of the electromagnet 80 is energized under the control of a circuit such as shown in FIG. 2. When the circuit de-energizes the coil, the force of the spring 19 urges the extension 32 to override the influence of the spring 58 to permit the shutter blades to move back to their closed position. Thus the length of the exposure interval is determined by the control circuit that energizes the electromagnet 80.

As mentioned above, when the release member 34 is depressed the switch S1 is closed by the detent 60 to energize the circuit shown in FIG. 2 by means of a battery source 90. The circuit also includes switches S2-4 which are actuated by the plate 43 and the rotor 41 associated with the impact driver 40 for relative rotation in response to rotational movement of the driver. Before the release member 34 is depressed sufficiently to release the drive member 40, the contact blades are relatively positioned, as indicated in FIG. 2, with switches S2 and S4 closed and switch S3 open. When switch S2 is closed a photoresistor 92 is connected in series with a variable resistance 94 to form a voltage divider circuit that provides a voltage at a junction 96 that is functionally related to the level of illumination incident on the photocell. The junction 96 is connected to the input 98 of a trigger circuit 100, which is adapted to switch from a nonconductive state to a conductive state when the voltage at the input 98 is below a predetermined value. This circuit is not shown in detail since this type of circuit is well known in the art. One well known example of such a circuit is a Schmitt trigger. The trigger circuit 100 includes a power lead 102, a ground lead 104 and an output lead 106. The trigger circuit in this embodiment is adapted to conduct current from the output lead 106 to the ground lead 104, only when the potential at the input lead 98 is below the predetermined value. When switches S2 and S4 are closed as shown in FIG. 2 an electric lamp 108 is connected with the output lead of the trigger circuit 100, and that lamp is energizable by the circuit in response to detection by the photoresistor 92 of a low scene condition.

However, when the inpact driver is actuated so that the rotor and plate are rotated with respect to each other to open switches S2 and S4 and close switch S3, the variable resistor 94 is connected in parallel with a second variable resistor 110 through the switch S3, and the series parallel combination of resistors 92, 94 and 110 is connected in series with a capacitor 112 which was previously shunted to ground by the switch S2. Also the junction 113 between the capacitor 112 and that series-parallel resistor combination is connected to the input 114 of a second trigger circuit 116. The connection of the capacitor 112 and the resistor combination including the photoresistor 92 forms an integrating circuit with the capacitor being charged through the resistor combination at a rate determined by the light level incident on the photoresistor. Upon actuation of the switch S2 to open an S3 to close, the voltage at the input 114 connected to the junction between the capacitor and the photocell-resistor combination changes from its initial potential to a predetermined value in a period of time depending on the well-known time constant "RC" of the integrating citcuit, which is determined by the value of the capacitor and the effective resistance value of the photocell 92 as established by the intensity of light from the scene to be photographed. When the voltage at the input terminal 114 of the trigger circuit 116 reaches the predetermined value, the trigger circuit is caused to switch from its conductive state to its nonconductive state thereby actuating the coil 80 connected to the output lead 118 of the trigger circuit 116 to release the shutter blade for movement back to its covering position to terminate an exposure interval. Thus, the exposure interval is initiated simultaneously with activation of the integrating circuit by the actuation of switches S2 and S3, and it is terminated by the trigger circuit 116 after a period of time determined by the integrating circuit according to the illumination incident on the photoresistor 92. Therefore, the length of the exposure interval is determined by the integrating circuit as a function of the level of scene illumination incident on the photocell.

Figure 3:
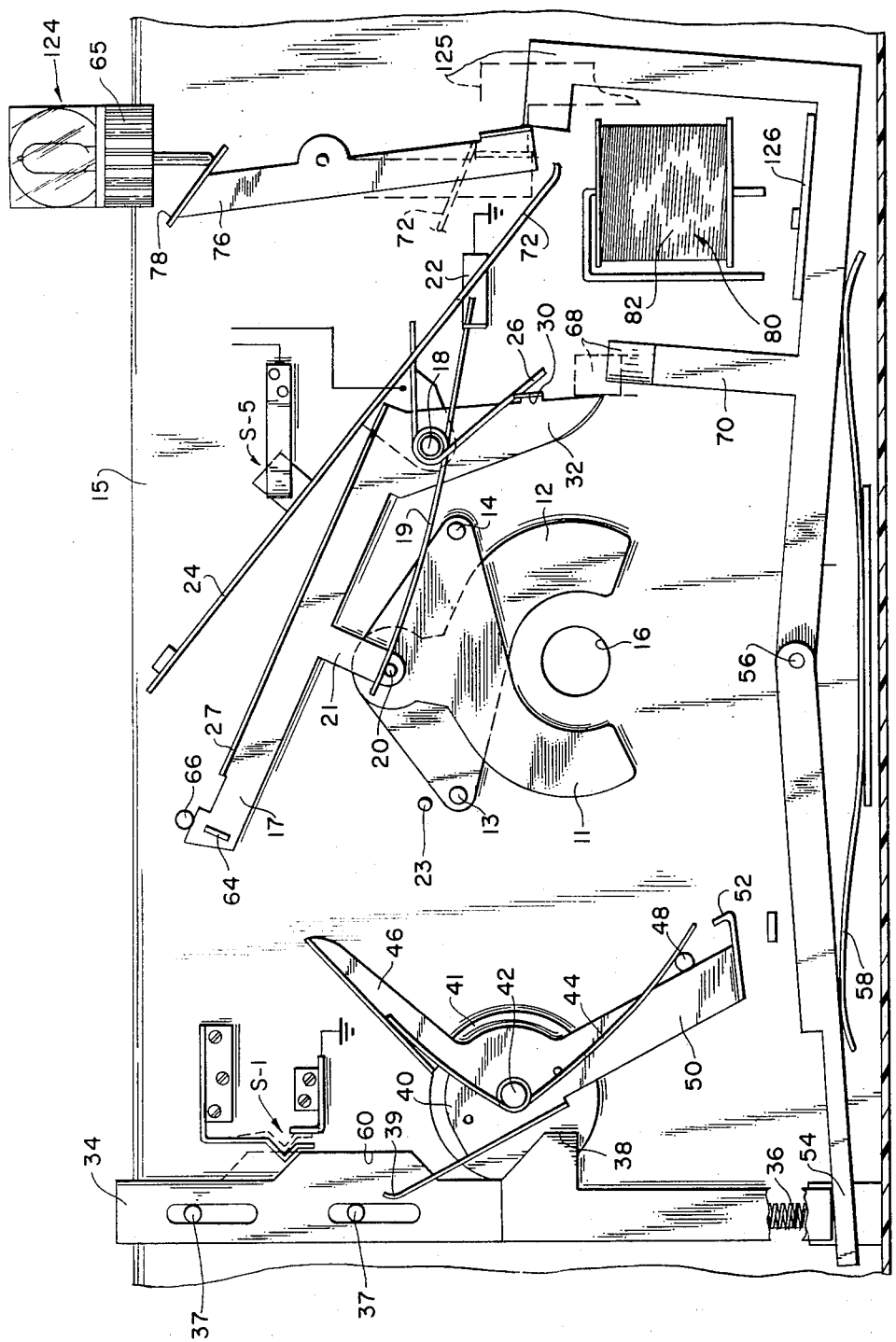
FIG. 3 is a view similar to FIG. 1 with the shutter open under the control of the mechanical speed control.

When an operator starts to depress the release member 34 the switch S1 is closed to activate the exposure control circuit shown in FIG. 2, and in low scene light conditions the trigger circuit 100 energizes the lamp 108 to indicate to the operator the existence of such low light conditions. The operator then has the option of continuing to depress the release member 34 to initiate an exposure interval that is timed by the integrating circuit in FIG. 2. However, the operator may prefer to take a flash picture in such low light conditions, and he can elect to insert a flash lamp 124 in the socket 65 provided in the camera for that purpose. The exposure control apparatus according to this invention is adapted to sense the presence or absence of a flash lamp in the socket by means of the sensor arm 78. When a flash lamp is inserted in the socket as seen in FIG. 3, the sensor arm 78 is caused to be displaced such that the lever 76 is rotated counterclockwise which results in a displacement of the stop 74 on the lever to be displaced out of the path of movement of the inertia lever 24 and to engage an arm 125 attached to the armature 126 associated with the latch member 70 to move the latch member out of latching position with respect to the arm 32 on the control armature 17. With the latch member 68 thus disabled by rotation of the lever 76, the shutter speed is no longer determined by the exposure control circuit shown in FIG. 2. Rather, the control armature 17 rotates until it strikes the stop member 66 and the inertia lever 24 continues rotating in a clockwise direction until it strikes the bracket 22, in which position a switch S5 is closed to ignite the flash lamp. The inertia lever than rebounds to strike the control armature and rotate the armature in a counterclockwise direction to close the shutter blades. Thus, the length of the exposure interval is determined by the design parameters of the control armature and inertia lever at a predetermined speed, when the shutter is not controlled by the timing circuit shown in FIG. 2.

The invention as been described in detail with particular reference to preferred embodiments thereof, but it will be understood that variations and modifications can be effected within the spirit and scope of the invention.

We claim:

1. In a camera of the type adapted to expose film to ambient and artificial light and including means for receiving an artificial lighting apparatus to said camera, exposure control apparatus comprising:
    a. photoresponsive means adapted to receive illumination from an object scene and having an electrical parameter variable as a function of the level of illumination incident thereon;
    b. activatable time-delay circuit means, including said photoresponsive means, for producing a control signal a period of time after activation thereof, said time-delay circuit means including means for establishing the time period as a function of said electrical parameter;
    c. actuatable shutter means for covering and uncovering the exposure aperture;
    d. means for actuating said shutter means to uncover said exposure aperture;
    e. return means for automatically actuating said shutter means to cover said exposure aperture in a predetermined fixed period of time;
    f. blocking means for engaging said shutter means to prevent said shutter means from being actuated by said return means to terminate the exposure interval after said predetermined fixed period of time, said blocking means being actuatable to release said shutter means to cover the exposure aperture;
    g. electromechanical transducer means for controlling actuation of said blocking means, said transducer means being connected with said circuit means for actuating said blocking means to release said shutter means to return to its covering position in response to said control signal from said time-delay circuit means;
    h. means for activating said time-delay circuit means in substantial synchronization with actuation of said shutter means to uncover said exposure aperture; and
    i. means for sensing a received artificial lighting unit to said camera;
    j. control means, responsive to sensing a received artificial lighting unit to said camera, for selectively disabling said blocking means to permit said shutter means to cover the exposure aperture after said predetermined fixed period of time.

2. In a camera adapted to expose film to ambient and artificial light, including means for receiving an artificial lighting unit to said camera, exposure control apparatus comprising:
    a. photoresponsive means adapted to receive illumination from an object scene and having an electrical parameter variable as a function of the level of received illumination;
    b. actuatable shutter means for covering and uncovering the exposure aperture;
    c. means for actuating said shutter means to uncover said exposure aperture;
    d. return means for actuating said shutter means to cover the exposure aperture a predetermined fixed period of time after actuation to uncover the exposure aperture;
    e. latch means for engaging said shutter means when said shutter means uncovers the exposure aperture to prevent said shutter means from being actuated by said return means to cover the exposure aperture, said latch means being actuatable to release said shutter means to cover the exposure aperture;
    f. electromechanical transducer means for controlling actuation of said latch means;
    g. a voltage-sensitive trigger circuit coupled with said transducer and adapted to switch from a first state to a second state to actuate said transducer to release said shutter means from said latch means when an input voltage to said voltage-sensitive switch reaches a predetermined minimum level;
    h. activatable time-delay circuit means, including said photoresponsive means and being connected with said input of said trigger circuit, for producing said voltage at the said voltage-sensitive trigger circuit input, said voltage varying from a first level upon actuation of said time-delay circuit means to said predetermined level over a period of time that is a function of the level of illumination incident onto said photoresponsive means;
    i. means for activating said time-delay circuit means in substantial synchronization with the actuation of said shutter means to uncover the exposure aperture; and
    j. means for sensing an artificial lighting unit received to said camera,
    k. control means, responsive to sensing an artificial lighting unit received to said camera, for disabling said latch means to permit the exposure time to be established by said return means.

* * * * *